United States Patent [19]

Newman

[11] 4,272,761

[45] Jun. 9, 1981

[54] OPERATIONS CONTROL SYSTEM

[75] Inventor: Raymond A. Newman, Cheektowaga, N.Y.

[73] Assignee: NP Industries, Inc., Tonawanda, N.Y.

[21] Appl. No.: 122,319

[22] Filed: Feb. 19, 1980

Related U.S. Application Data

[63] Continuation of Ser. No. 858,747, Dec. 8, 1977, abandoned.

[51] Int. Cl.³ .................. G08B 23/00; B67D 5/08
[52] U.S. Cl. .................. 340/500; 340/501; 340/309.1; 340/309.4; 328/130; 222/64
[58] Field of Search .............. 340/500, 501, 516, 517, 340/521, 522, 523, 526, 309.1, 309.4; 328/69, 72, 75, 129, 130; 307/41; 361/166, 196; 222/64, 65, 70

[56] References Cited

U.S. PATENT DOCUMENTS

| | | | |
|---|---|---|---|
| 3,603,961 | 9/1971 | Duris | 340/309.1 |
| 3,774,056 | 11/1973 | Sample et al. | 328/130 |
| 3,824,480 | 7/1974 | Eghraghian | 328/75 |
| 3,876,950 | 4/1975 | O'Connor | 328/130 |
| 3,901,087 | 8/1975 | Fabritius | 73/421 B |
| 4,023,109 | 5/1977 | Shreve | 328/130 |
| 4,024,766 | 5/1977 | Perry | 73/422 R |

Primary Examiner—Donald J. Yusko
Assistant Examiner—Donnie L. Crosland

Attorney, Agent, or Firm—Joseph P. Gastel; Martin Lukacher

[57] ABSTRACT

A system for controlling operations of a process or of another system or apparatus which must perform its operations in precise time sequence. The control system also initiates the performance of successive cycles of such sequences of operations with the same precision of timing as the operations themselves. A timing generator which operates from or includes a constant frequency source produces pulses of constant periodicity which time the operations so that they occur in selected time sequence during each cycle, starting when a cycle is initiated. The timing of the operations and their duration may be preset for the process, apparatus or system to be controlled. A large timing range is provided to meet the needs of the particular process system or apparatus and to make adjustments as may be required in the field. The cycles of operation sequences may be selected in accordance with the mode of operation desired. A preset interval timer operated by the timing generator may be selected by the mode selector to initiate the cycles of operation at preset time intervals. Other apparatus which may be located remotely from the control system may initiate a cycle of operations. Control of the operations in response to external control signals such for example as represents the level of liquid or other materials being processed or monitored, may be used to control the duration of an operation and if the signal does not arrive, to terminate the cycle of operations and indicate a fault condition.

14 Claims, 5 Drawing Figures

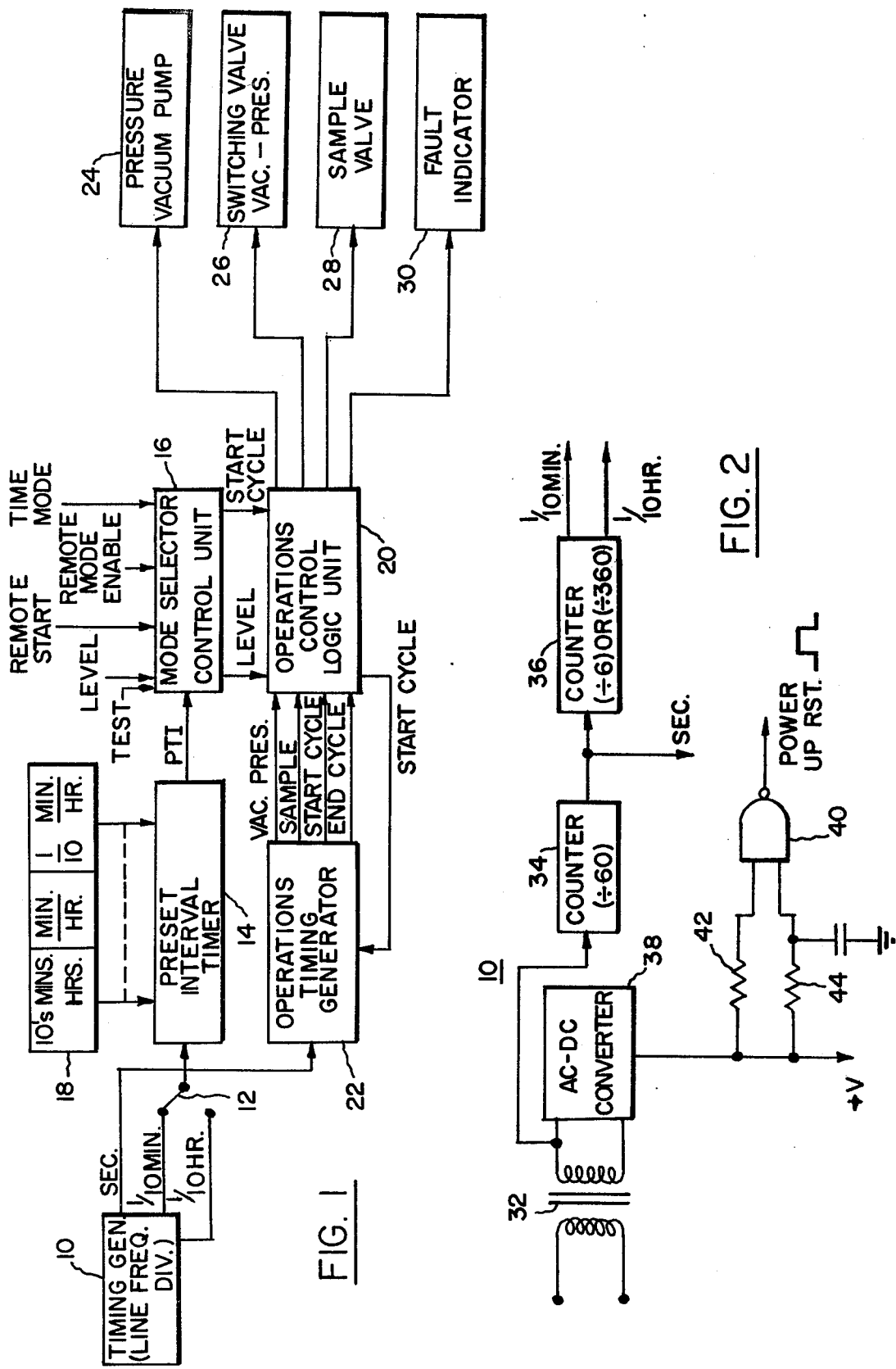

OPERATIONS CONTROL SYSTEM

This is a continuation, of application Ser. No. 858,747 filed on Dec. 8, 1977, and now abandoned.

The present invention relates to operations control systems and particularly to a system for controlling a cycle of successive operations so that they occur in predetermined or preselected time sequence.

The invention is especially suitable for use in process control applications; one such application being an effluent monitoring system. Effluents, such as waste water (sewer outflows) require sampling either at predetermined time intervals or when a predetermined volume of waste water has flowed through a channel, such as the sewer outflow pipe. A waste water sampling system with which the invention may be used is described in U.S. Pat. No. 4,024,766, issued to Jack A. Perry on May 31, 1977.

Various operations must be carried out with precise timing in order for a process or a system or apparatus to operate satisfactorily and in accordance with its specifications. Such operations may be the running of a motor, the closing or opening of a valve, the actuation of a relay, and the like. Precision timing of the initiation of cycles of such operations must oftentimes be obtained. In addition, the timing may need to be adjustable so that the same control system may have universal application to be usable with a large number of different processes, systems and apparatus. Further adjustments in timing may be required in the field in order to meet particular needs and to accommodate variations and tolerances in components of the process, system or apparatus with which the control system is used. The timing and duration of one or more operations in each cycle must in many applications, such as the waste water sampling system mentioned above, be subject to the occurrence of events which may vary in time. The control system must accommodate such external events and control the timing of operations according to their occurrence. The system must guard against improper operations of the process and the system or apparatus being controlled so as to terminate operations in case of fault conditions. In addition to external control of the initiation of cycles of operations continuous, recurrence of these cycles at preset time intervals must be repetitive with precisely the same timing. The operations control system must oftentimes be located in severe environments where extremes of temperature may be encountered, and where it may not be accessible for servicing and maintenance. Nevertheless, precision timing of the operations remains a requirement even though cycles of operations may occur only after long intervals of time, say several hours. Yet these intervals must be precisely repeatedly.

Design of control systems to overcome all of the foregoing difficulties has constituted a problem which, prior to this invention, has not been solved satisfactorily. The aforementioned patent issued by Jack A. Perry has provided an electro-mechanical system for controlling waste water sampling operations. Although a substantial improvement in the timing of waste water sampling operations has been afforded by the system of the Perry patent, the timing motors used in that system do not provide precision timing which is repeatable again and again over long periods of time. Another approach involving resistance capacitance timing circuits has been proposed in U.S. Pat. No. 3,901,087 issued to Hannes Fabritius on Aug. 26, 1975. Precision timing particularly for long time intervals, say in excess of a few seconds, is not obtainable with such timing circuits. Moreover such circuits are subject to variations due to environmental effects, particularly changes in temperature.

Accordingly, it is an object of the present invention to provide an improved operations control system in which precision timing of operations of a process, system or apparatus can be obtained.

It is another object of the present invention to provide an improved operations control system wherein precision timing of operations, repeatably and under extreme environmental conditions, can be obtained.

It is a further object of the present invention to provide an improved operations control system wherein successive cycles each containing a plurality of successive operations may be controlled so that both the intervals between cycles and the timing of the operations in each cycle are precisely timed.

It is a still further object of the present invention to provide a system for accurately controlling the operations of a process such as a waste water sampling process.

It is a still further object of the present invention to provide an improved operations control system wherein all of the foregoing difficulties and disadvantages are substantially eliminated at reasonable cost.

Briefly described an operations control system for controlling a cycle of successive operations so that they occur in predetermined time sequence as may be provided in accordance with the invention, includes a timing generator for generating timing signals which recur repetitively with constant periodicity. These timing signals and a start command are applied to operation timing means which produces a cycle of outputs corresponding to different ones of the successive operations. The start command may be generated either internally, or remotely in response to an event in the process system or apparatus being controlled, such as the waste water in a waste water sampling chamber reaching a predetermined level. Alternatively, the start command may be generated at preset time intervals in response to timing signals from the timing generator. Operations control means are operated by the outputs from the operations timing means and control each of the operations.

The foregoing and other objects, features and, advantages of the present invention as well as a presently preferred embodiment thereof will become more apparent from a reading of the following description in connection with the accompanying drawings in which:

FIG. 1 is a block diagram of an operations control system embodying the invention which may be used with a waste water sampling system as described in the above mentioned patent issued to Jack A. Perry;

FIG. 2 is a more detailed block diagram of the timing generator shown in the system illustrated in FIG. 1;

Figure 3:
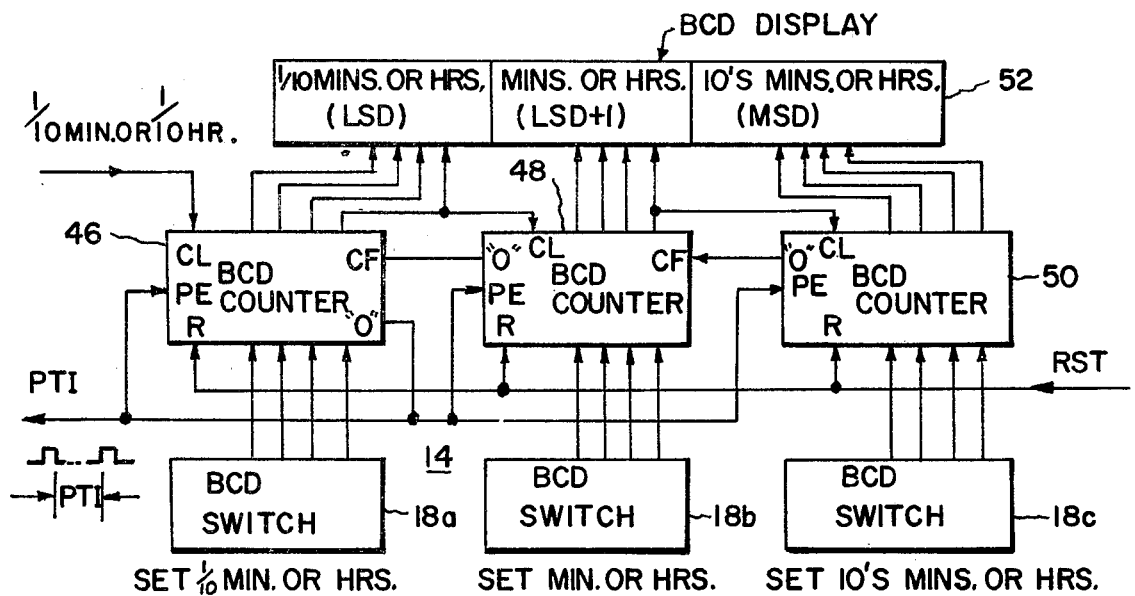
FIG. 3 is a more detailed block diagram of the preset interval timer shown in the system illustrated in FIG. 1.

Referring more particularly to FIG. 1, the timing generator 10 produces a plurality of timing signals having different periodicity. There is a "second" signal which occurs every second. Other signals occur at decimally related portions of larger increments of time, namely each tenth (10th) of a minute and each tenth (10th) of an hour. Either the tenth minute timing signal or the 10th hour timing signal may be selected by a switch 12 depending upon the intervals at which successive cycles of operations are desired. If the intervals are minutes or portions of minutes, the tenth minute output is used. If the intervals are hours or portions of hours the 10th-hour output is used.

The timing generator may include a source of constant frequency signals such as an oscillator, preferably a crystal oscillator or other oscillator which is stabilized in frequency. The advantages of a constant frequency and periodicity of the timing signals without a need for temperature stabilization circuitry is obtained by using the alternating current (A.C.) line frequency, in which case the timing generator 10 is a line frequency divider which produces the seconds, 10th minute and 10th-hour outputs. The timing generator may be implemented from solid-state components which are operative over a large temperature range, both at extremely cold and extremely hot temperatures and are unaffected by other adverse environmental conditions which would prevent repeatedly accurate timing in an electro-mechanical timer or from resistance capacitance timing circuits.

A preset interval timer 14 outputs a predetermined time interval (PTI) output pulse to a mode selector control unit 16. The PTI pulse is used by the unit 16 whenever the time mode is selected by the application of a time mode enabling input thereto. The time mode initiates cycles of operation repeatedly at the preset intervals selected by means of selector switches 18, which preset the timer 14. Three such switches are used which respectively select the decimally related portions of the selected time interval selected by the switch 12, either minutes or hours. Thus the most significant digit selects either tens of minutes or hours, the next digit selects units of minutes or hours and the least significant digit switch 18 selects tenths of minutes or hours. The PTI pulses can, in this embodiment of the invention, occur over a range from 0.1 minute to 99.9 hours. Since the timing of the PTI pulses is determined by the timing generator 10, precise accurate timing which is repeatable and stable with the same accuracy over long periods of time is provided.

The mode selector control unit is designed to provide for either a remote or external mode of operation or a time mode of operation. A test mode is also provided for. When the remote mode is enabled, the process controls the initiation of each successive cycle. In the case of the waste water sampling system described in the above-mentioned patent issued by Jack A. Perry, a flow volume computer provides the external signal when a certain volume, say several million gallons of waste water passes through the waste water conduit. The remote mode is enabled by a level which when asserted selects the remote mode. Alternatively, the time mode is enabled by a similar level which when asserted enables the PTI pulses to start the cycle of operation. The occurrence of an event in the process or in the operation of the system or apparatus being controlled may also be inputted to the mode selector unit as an input control signal. In the case of the waste water sampling system, this event is the waste water in a sampling conduit or leg reaching a predetermined level, such that the sample of requisite size (volume) is made available for sampling. This level input as well as the start cycle input, whether in response to the PTI pulse or to a pulse on the remote start input line from the flow volume computer, is inputted to an operations control logic unit 20.

An operations timing generator 22 cooperates with the operations control logic unit 20. The operations timing unit also receives the seconds timing signal from the timing generator 10. When the start cycle is signalled, the operations control logic unit 20 outputs a start cycle pulse to the operations timing generator 22 which initiates the operations timing sequence. A sequence of outputs is then provided. These outputs begin with the start cycle output and end with the end cycle output. Other operations are timed to occur at the precise time intervals after the start cycle operation. The end cycle operation also occurs a precise time interval after the start cycle operation. The time intervals between each of the operations is also precisely and accurately controlled by the operations timing generator 22. These other operations are, in the case of the waste water sampling system, a vacuum-pressure operation and a sampling valve operation.

The operations ouputs are inputted to the operations control logic unit 20 which outputs them to relays or other means for controlling the various operations in the time sequence dictated by the timing of the operations outputs. First, the start cycle output is applied to tart a pressure-vacuum pump 24. This pump need not be on continuously but only during a cycle of operation. The vacuum pressure output operates a switching valve 26 which switches a line from the vacuum pump 24 to a sampling leg of the waste water sampling system from a pressurized to a vacuum condition. With vacuum present, the waste water rises in the sampling leg. The level pulse then terminates the vacuum operation such that the switch valve 26 switches back to pressurize the leg which draws the sample of waste water. By this time the level of the waste water sample has risen above a side or discharge arm and has discharged into that arm. The next operation, of opening a sample valve 28 for a period of time to allow the sample in the discharge arm to be deposited into a sampling chamber, then occurs. This sampling time is determined by the sample output from the operations timing generator 22. Finally the end cycle output occurs which turns off power to the pressure vacuum pump and the system is reset to await the next cycle of operations.

If for example the level pulse does not occur then the vacuum pressure output continues to the end of its preset duration, as determined by the operations timing generator 22, the operations control logic unit 20 responds to the absence of a level pulse before the end of the vacuum pressure output by initiating an end cycle operation and operating a fault indicator 30. The system then automatically resets in the event of a fault in the operation and the fault condition is displayed on the indicator 30. The continued presence of a fault indication will alert the maintenance personnel to an improper operation of the waste water sampling system. If the fault clears itself, the indicator 30 automatically resets to a clear condition (e.g., a fault indicator lamp is extinguished).

Referring to FIG. 2, the timing generator 10 obtains timing signals from the A.C. line at the secondary of a transformer 32. The primary of that transformer may be connected across the A.C. line. A line frequency divider consists of a divide-by-sixty counter 34 which counts cycles of the line frequency to produce the seconds output of the timing generator 10. Another counter 36 counts the seconds outputs and divides them either by six to produce the one-tenth minute output, or by 360 to produce the 10th-hour output. These counters 34 and 36 may be implemented by binary counters having selector gates and feedback gates which reset the binary counters upon occurrence of the gated output pulse. Power for the system is obtained from the A.C. line power by an A.C. to D.C. converter 38. A reset signal is obtained when the system is turned on (e.g., the A.C. line is connected to the primary of the transformer 32, by a NAND gate 40, the inputs of which are connected to the line via a resistor 42 and a R-C time delay circuit 44. This is a power-up reset (RST).

The preset interval timer 14, as illustrated in FIG. 3, uses three tandem connected binary coded decimal (BCD) counters 46, 48 and 50. The counter 46 for the least significant digit is clocked by the one-tenth minute or 10th hour output as selected by the switch 12 (FIG. 1). The next highest order digit counter 48 and the most significant digit counter 50 are clocked when their preceding counters reach a count of 10. Through the use of one-tenth minute or 10th hour outputs, time intervals in decimally related portions of minutes or hours are directly accumulated and may be displayed on a BCD display 52. The display includes driver logic and LED or other display elements which are driven by the counters 46, 48 and 50. The counters are preset by three BCD switches 18a, 18b, and 18c, which may be thumb wheel switches. The counters are reset by the power-up RST output (viz, on the negative edge of RST) and are preset by each PTI output pulse. The PTI pulses are produced by all of the counters 46, 48 and 50 recycled to "0", which also occurs on RST. Internal gating in the counters results in a "0" output when the carry forward (CF) inputs and the "0" output are both in the "0" state.

Figure 4:
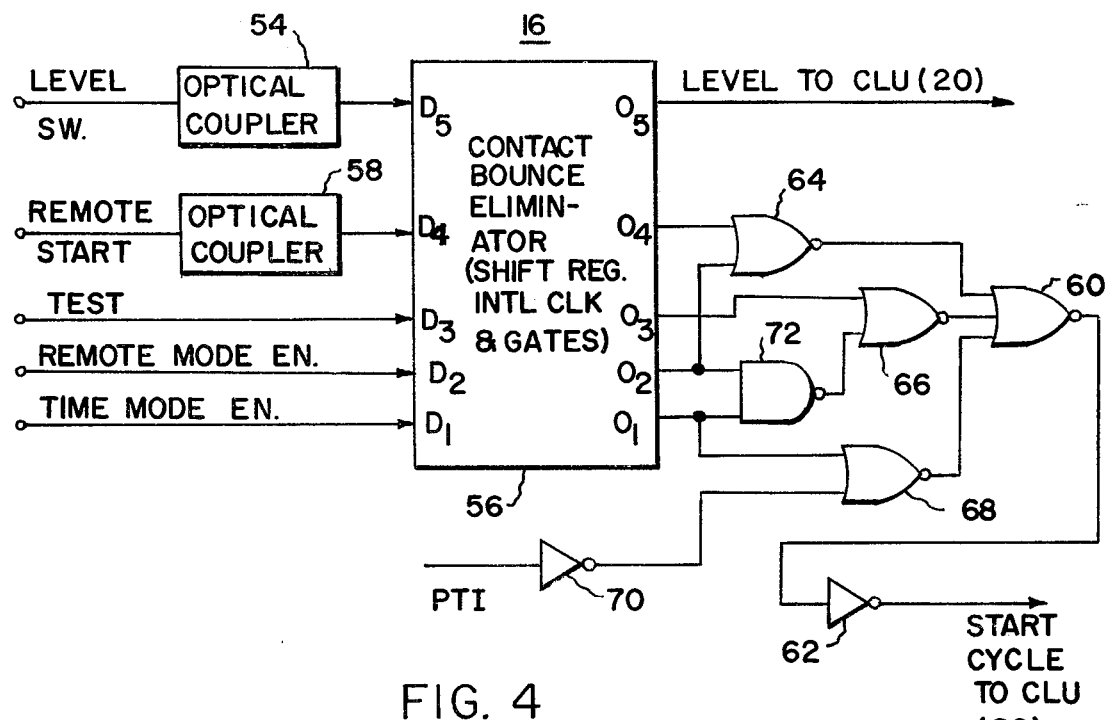
FIG. 4 is a more detailed block diagram of the mode selector control unit shown in the system illustrated in FIG. 1.

The mode selector control unit 16, as shown in FIG. 4, receives the level input upon actuation of a level switch in the waste water sampling system. This switch may be connected to the control unit 16 by a long line subject to pick up of noise as well as signal attenuation. Accordingly, an optical coupler 54 (e.g., a light emitting diode and a photo transistor) may be used for isolation purposes and to apply the level switch input to an input of a contact-bounce eliminator integrated circuit 56. Similarly another optical coupler 58 may be used to apply the remote start input to another input of the contact-bounce eliminator. The remote start input may also be obtained from a switch closure. These switches may be relay operated switches as described in the above-mentioned patent issued to Jack A. Perry. Remote mode enable, test and time mode enable inputs also use the contact-bounce eliminator 56 and are applied to different inputs thereof. In this illustrative example the inputs are asserted (present) when in a low or "0" state so as to be compatible with the NOR and NAND gate logic which is utilized in the illustrated system. The contact-bounce eliminator consists of a series of parallel shift registers internally clocked and gated so as to provide outputs when the shift register stages of each register are in the same state. Until a switch closure stabilizes, the switch contacts may bounce. Then the shift registers will not be in the same state and the outputs, $0_1$ to $0_5$ of the bounce eliminator remain unchanged. Accordingly, reliable system operations in spite of contact bounce or noise pick-up is obtained in the mode selector control unit 16. Further information respecting contact-bounce eliminators integrated circuits may be obtained from Motorola Semiconductor Products which have available a contact-bounce eliminator circuit, their Part No. MC 14490.

The level output is obtained from the contact-bounce eliminator output $0_5$, which is the output of the shift register chain to which the level switch inputs are applied at data input $D_5$. A NOR gate 60 drives an inverter 62 to produce a high ("1") pulse as a start cycle output to the operations control logic unit 20. All of the mode outputs $0_1$, $0_2$, and $0_3$ from the bounce eliminator 56 are inputted to NOR gates such that when all of these inputs are not asserted the output of the inverter 62 is low. A positive pulse is required to start the cycle. The cycle then does not start until one of the mode enable inputs is asserted. For example when the time mode is enabled, the positive PTI pulse, which is inverted in an inverter 70, enables the NOR gate 68 so that the output of the NOR gate 60 goes low and the output of the inverter 62 goes high to produce a start cycle pulse during the interval of the PTI pulse. The NOR gate 64 operates in a manner similar to the NOR gate 68 when the remote mode is enabled and a remote start pulse is inputted to the mode selector control unit 16.

NAND gate 72 inhibits the test input from starting the cycle in the event that either of the remote mode enable or the time mode enable inputs are present. In the absence of these mode enable inputs and the presence of a test pulse, the NOR gate 66 will output the pulse through the NOR gate 60 and the inverter 62 to start the cycle. The system will then be tested.

Figure 5:
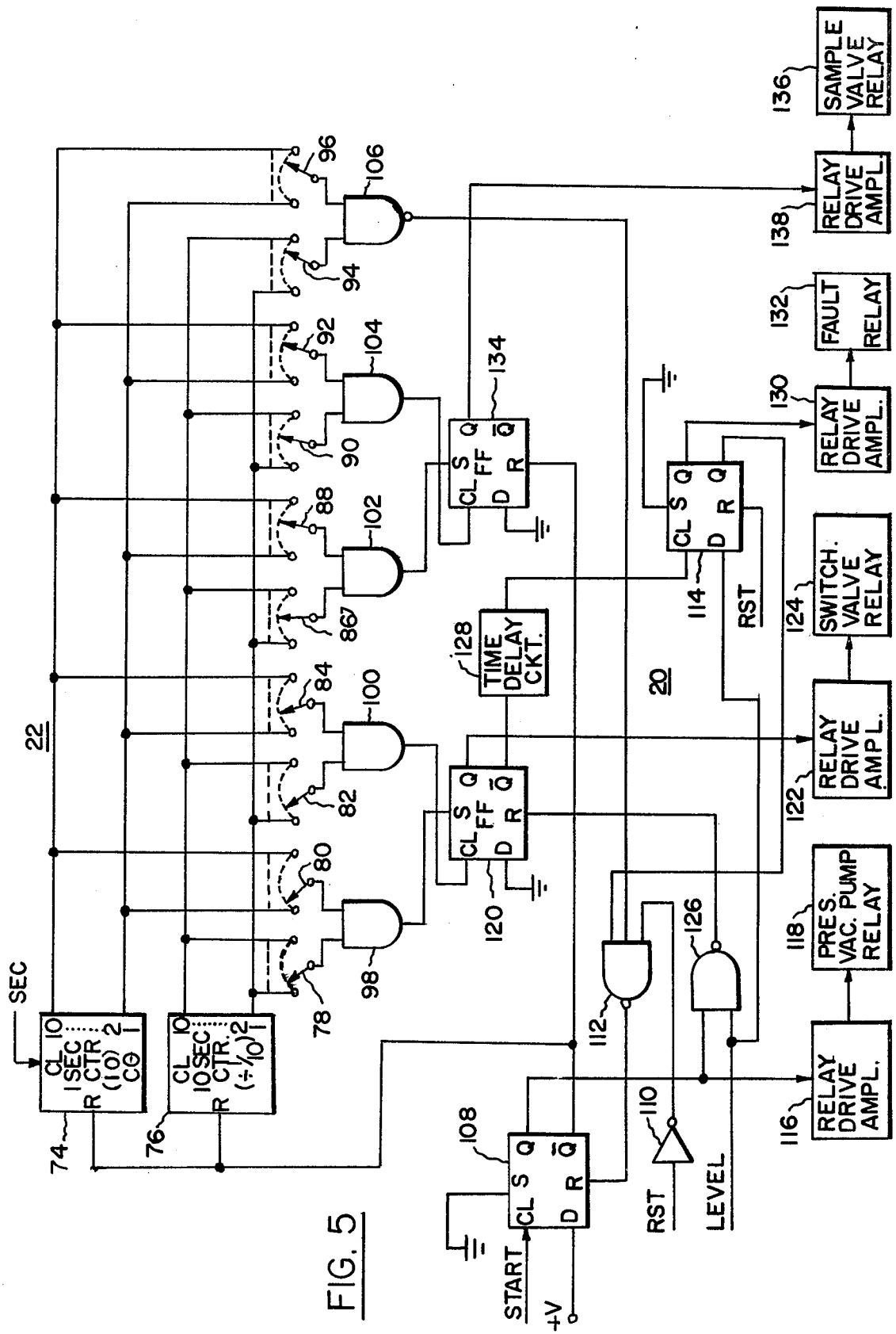
FIG. 5 is a more detailed block diagram which illustrates the operations control logic unit and the operations timing generator shown in the system illustrated in FIG. 1.

Referring to FIG. 5, the operations timing generator is provided by a pair of tandem connected counters 74 and 76. These are decimal counters which provide a one-out-of-ten output for each ten successive input pulses from the seconds output of the timing generator. A successive one of the ten outputs of the first counter 74 goes high. For each successive ten pulses a successive one of the ten outputs of the second counter 76 goes high. Accordingly, the second counter 76 counts tens of seconds as the first counter 74 counts seconds.

Increments of time, starting from the time when the counters 74 and 76 are reset, for timing the operations are selected by pairs of switches 78, 80; 82, 84; 86, 88; 90, 92; and 94, 96. Each switch has ten fixed contacts and a movable contact. The fixed contact of the switches 80, 84, 86, 92 and 96, are connected to the "seconds" outputs of the first counter 74. The fixed contact of the switches 78, 80, 82, 86, 90, and 94, are connected to the "ten seconds" outputs of the second counter 76, AND gates 98, 100, 102 and 104 are connected to different pairs of these switches and produce four different outputs at four different times after the start of the cycle. Two of these outputs from the gates 98 and 100 control the switching valve 26. The outputs from the gates 102 and 104 control the sample valve 28 (FIG. 1). A NAND gate 106, connected to the movable contacts of the last pair of switches 94 and 96, produces an output at the end of the cycle which terminates the operation of the pressure vacuum pump 24 (FIG. 1). The wide range of times from one to 99 seconds after the start of the cycle permit selection of a wide range of precision times for each operation which is to be controlled and for the duration of these operations.

The operations control logic unit 20 utilizes a D-type flip-flop 108 to start and stop the cycle. This flip-flop is reset by the RST pulse through an inverter 110 and NAND gate 112 which applies a positive (high) level until the RST level goes low (viz, at the time of the trailing edge of the RST pulse). The $\overline{Q}$ output of the flip-flop 108 then goes high and the counters 74 and 76 are reset and remain reset until a start cycle pulse is applied to the clock input of the flip-flop 108 at which time the reset level from the $\overline{Q}$ output of the flip-flop 108 is removed from the counters 74 and 76.

In the absence of a fault condition another D-type flip-flop 114, which is reset by the RST pulse, provides an input to the NAND gate 112 which remains high throughout the cycle. At the end of the cycle, when the output of the end cycle NAND gate 106 becomes low, a positive pulse is generated and applied to the reset input of the flip-flop 108 to reset the flip-flop 108. The Q output of the flip-flop 108 operates a relay drive amplifier 116 which drives a pressure vacuum pump relay 118 when the flip-flop 108 is set, which occurs for the duration of the cycle, the relay 118 is then operated and the pressure vacuum pump 24 (FIG. 1) is on.

Another D-type flip-flop 120 is set by the output of the first AND gate 98. Its Q output goes high and a relay drive amplifier 122 responds by actuating a switching valve relay. The switching valve 26 then switches the sampling leg of the water sampler system from a pressurized condition to a vacuum condition and a sample is drawn. The end of the sampling operation should occur when the level input is asserted such that a NAND gate 126, which is then enabled by the high Q output of the flip-flop 108, generates a pulse which resets the flip-flop 120. In case of a fault condition, the time for the end of a sampling operation, as indicated by the output of the AND gate 100, clocks the flip-flop 120. Since the D input of flip-flop 120 is grounded (low), the Q output of that flip-flop will then go low and terminate the switching valve operation so that the sampling leg again becomes pressurized. The flip-flop 114 detects this fault condition. If the level of the sampling leg is high enough to produce a level output, the D-input of flip-flop 114 will be low at the time a clocking pulse arrives. This clocking pulse is generated at the time the flip-flop 120 is reset after being delayed in a time relay circuit 128. This circuit 128 may be implemented by a resistance capacitance circuit and gates to provide buffering and pularity inversion.

The presence of a level switch input causes the D input of flip-flop 114 to remain low and the flip-flop remains reset. However, in the absence of a level switch input, the D input of the flip-flop 114 becomes high and the flip-flop is set. A relay drive amplifier 130 then drives a fault relay 132 which operates the fault indicator 30 (FIG. 1) to alert the presence of a fault in the operation of the waste water sampling system. The $\overline{Q}$ output of the fault flip-flop 114 also enables the NAND gate 112 to apply a positive level to the reset input of the cycle flip-flop 108 which then resets to terminate the cycle.

In the absence of a fault condition, the cycle proceeds with a sampling operation. A sample valve D-type flip-flop 134, which is reset at the start of the cycle, is set at the beginning of the sampling operation by the output of the AND gate 102 and reset after the sampling duration by being clocked by the output from the AND gate 104. A sample valve relay 136 is driven while the flip-flop 134 is set by a relay drive amplifier 138 which is connected to the Q output of the flip-flop 134. The sample valve 28 (FIG. 1) is then operated at the time during the cycle and for a period dictated by the operations timing generator 22. At the end of the cycle the NAND gate 106 provides the cycle terminating pulse which resets the system as above explained.

From the foregoing description it will be apparent that there has been provided an improved operations control system. The system has been illustrated in accordance with a presently preferred embodiment for use with a waste water sampling system. Other application for the operations control system and variations and modifications therein, within the scope of the invention, will undoubtedly suggest themselves to those skilled in the art. Accordingly, the foregoing description should be taken as illustrative and not in any limiting sense.

What is claimed is:

1. An operations control system for an effluent monitoring system for controlling a cycle of successive operations upon occurrence of each passage of a predetermined period of time and any of a plurality of different effluent monitoring events so that said operations occur in predetermined time sequence, said system comprising timing generator means for generating timing signals which occur repetitively with constant periodicity, preset interval timing means for producing first outputs at preset time intervals equal to said predetermined period of time, means responsive to said events and to said preset interval timing means first outputs for generating a start command upon occurence of said first outputs and of any of said plurality of effluent monitoring events, operation timing means responsive to said timing signals and to said start command for producing a cycle of second outputs corresponding to different ones of said successive operations, and operations control means operated by said second outputs for controlling each of said operations.

2. The invention as set forth in claim 1 wherein said operations control means includes means responsive to said second outputs for controlling the duration of each of said operations.

3. The invention as set forth in claim 2 wherein said operations control means further includes means operated by an input signal for terminating a certain one of said operations upon occurrence of said input signal.

4. The invention as set forth in claim 3 wherein said operations control means further includes means for operation by the one of said second outputs which controls the duration of said one operation for terminating said cycle of operation upon occurrence thereof prior to the occurrence of said input signal.

5. The invention as set forth in claim 4 wherein said system further comprises fault indicating means operated by said means for terminating said cycle for indicating a fault in the operation of the apparatus controlled by said operations control system.

6. The invention as set forth in claim 1 wherein said preset interval timing means is operated by said timing generator means for generating as said first outputs relative signals separated by preset intervals of time, and means included in said start command generating means for generating said start command upon occurrence of each of said preset time interval signals.

7. The invention as set forth in claim 6 wherein said start command generating means is a mode selector control unit having a plurality of inputs for enabling the generation of said start commands and a plurality of inputs operative to provide said start commands, one of said plurality of inputs being said predetermined time interval signals.

8. The invention as set forth in claim 1 wherein said timing generator means includes a source of constant frequency signals, and said source includes means responsive to the signals from an A.C. power line for dividing the frequency of said A.C. line signals to produce said timing signals.

9. The invention as set forth in claim 1 wherein said timing generator means includes a source of constant frequency signals, said source including a plurality of counters for dividing the frequency of said constant frequency signals to produce first and second timing signals having different periodicity, said first signals occurring each second and said second signals occuring at a decimally related fraction of a unit of time which is a multiple of 60 times one second.

10. The invention as set forth in claim 9 wherein said preset interval timing means includes means for counting said second signals and producing said first outputs for providing inputs at said preset times to said start command generating means to provide for generation of said start commands at preset intervals of time corresponding to a preset number of said second signals.

11. The invention as set forth in claim 10 wherein said operations timing means includes a pair of tandem connected decimal counters responsive to said first timing signals, and means connected to said counters for selectively deriving said outputs.

12. The invention as set forth in claim 11 wherein said means for selectively deriving said outputs includes a plurality of pairs of switches, each switch having fixed terminals and a movable arm, said fixed terminals of each switch pair being separately connected to the output terminals of different ones of said pair of counters, and a plurality of gate means separately input connected to the movable arms of each switch pair, said gate means providing said outputs.

13. The invention as set forth in claim 12 wherein said operations control means includes control logic means comprising a start flip-flop, means responsive to said start command and to the output of a first of said plurality of gates for conditioning said start flip-flop to produce a drive signal for controlling a first of said operations between the times of occurrence of said start command and said first gate output, said start flip-flop also being connected to said tandem counters to enable said counters to count up between said times of occurrence, a plurality of second flip-flops, means responsive to the outputs of different ones of the others of said plurality of gates for conditioning said plurality of second flip-flops to produce drive signals for controlling others of said plurality of operations between the time of occurrence of different pairs of the outputs from said others of said plurality of gates.

14. The invention as set forth in claim 13 wherein said control logic means includes a third flip-flop, means responsive to an input signal for conditioning one of said second flip-flops to terminate its drive signal means, and responsive to said one of said second flip-flops and said input signal for conditioning said third flip-flop to generate another drive signal indicative of a fault in operation when said one of said second flip-flops is conditioned to terminate its drive signal and said input signal is absent.

* * * * *

UNITED STATES PATENT AND TRADEMARK OFFICE
CERTIFICATE OF CORRECTION

PATENT NO. : 4,272,761

DATED : June 9, 1981

INVENTOR(S) : Raymond A. Newman

It is certified that error appears in the above—identified patent and that said Letters Patent are hereby corrected as shown below:

Column 3, line 54, change "by" to --to--.
Column 8, line 58, (claim 6), change "relative" to --repetitive--.

Signed and Sealed this

Twenty-fifth Day of August 1981

[SEAL]

Attest:

GERALD J. MOSSINGHOFF

Attesting Officer  Commissioner of Patents and Trademarks